(12) United States Patent
Kozuka (10) Patent No.: US 10,717,425 B2
(45) Date of Patent: Jul. 21, 2020

(54) BRAKING FORCE CONTROL SYSTEM

(71) Applicant: TOYOTA JIDOSHA KABUSHIKI KAISHA, Toyota-shi, Aichi-ken (JP)

(72) Inventor: Tomoyuki Kozuka, Shizuoka-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 5 days.

(21) Appl. No.: 16/039,974

(22) Filed: Jul. 19, 2018

(65) Prior Publication Data

US 2019/0071061 A1 Mar. 7, 2019

(30) Foreign Application Priority Data

Sep. 6, 2017 (JP) ................. 2017-171359

(51) Int. Cl.
| | |
|---|---|
| *B60L 7/26* | (2006.01) |
| *B60T 13/66* | (2006.01) |
| *B60T 8/17* | (2006.01) |
| *B60T 13/74* | (2006.01) |
| *B60T 8/00* | (2006.01) |
| *B60T 7/22* | (2006.01) |

(52) U.S. Cl.
CPC .............. *B60T 13/662* (2013.01); *B60T 7/22* (2013.01); *B60T 8/00* (2013.01); *B60T 8/17* (2013.01); *B60T 13/745* (2013.01); *B60T 13/746* (2013.01); *B60T 2201/022* (2013.01); *B60T 2270/413* (2013.01)

(58) Field of Classification Search
CPC .......... F16D 65/847; B60T 7/06; B60T 7/042; B60T 7/12; B60T 8/325; B60T 8/885; B60T 13/662; B60T 13/745

USPC ..... 188/71.5, 71.6, 156–165; 303/3, 122.09; 244/110 A, 111; 701/22, 70, 72

See application file for complete search history.

(56) References Cited

U.S. PATENT DOCUMENTS

| | | | |
|---|---|---|---|
| 9,586,488 B2 * | 3/2017 | Nakaoka | B60L 3/102 |
| 10,300,896 B2 * | 5/2019 | Jones | B60T 8/885 |
| 2012/0065816 A1 * | 3/2012 | Cahill | B60T 8/00 |
| | | | 701/3 |
| 2013/0175403 A1 * | 7/2013 | Spray | B60T 8/1703 |
| | | | 244/235 |

(Continued)

FOREIGN PATENT DOCUMENTS

JP 2015-143058 A 8/2015

*Primary Examiner* — Christopher P Schwartz
(74) *Attorney, Agent, or Firm* — Sughrue Mion, PLLC (57) ABSTRACT

A braking force control system includes a braking mechanism configured to generate a braking force for the vehicle, a first unit configured to supply a braking oil pressure to the braking mechanism, a second unit configured to supply a braking oil pressure to the braking mechanism by using a path other than a path used by the first unit, and an electronic control unit configured to execute braking control by alternatively operating the first unit or the second unit. The electronic control unit is configured to execute first braking control by operating the first unit in a case where the second unit is not operated when an execution request for the first braking control is received and execute the first braking control by continuously operating the second unit in a case where the second unit is operated when an execution request for the first braking control is received.

7 Claims, 5 Drawing Sheets

(56) References Cited

U.S. PATENT DOCUMENTS

| | | | |
|---|---|---|---|
| 2013/0253736 A1* | 9/2013 | Frank | B64C 25/426 |
| | | | 701/3 |
| 2015/0246662 A1* | 9/2015 | Masuda | B60T 7/085 |
| | | | 701/70 |
| 2016/0023645 A1* | 1/2016 | Wright | B60T 15/184 |
| | | | 303/66 |
| 2016/0039292 A1* | 2/2016 | Takahashi | B60W 10/08 |
| | | | 701/70 |
| 2016/0039396 A1* | 2/2016 | Cahill | B64C 25/44 |
| | | | 701/3 |
| 2016/0318492 A1* | 11/2016 | Miller | B64C 25/42 |
| 2017/0144750 A1* | 5/2017 | Cahill | B60T 8/1703 |
| 2017/0182990 A1 | 6/2017 | Ninoyu et al. | |
| 2018/0297573 A1* | 10/2018 | Alam | B60T 17/221 |

* cited by examiner

|  |  | UNIT A OPERATION REQUEST | | UNIT B OPERATION REQUEST | |
| --- | --- | --- | --- | --- | --- |
|  |  | ON | OFF | ON | OFF |
| UNIT A OPERATION | ON | UNIT A OPERATION = ON | - | UNIT A OPERATION = ON | - |
| | OFF | UNIT A OPERATION = ON | - | UNIT B OPERATION = ON | - |
| UNIT B OPERATION | ON | UNIT B OPERATION = ON | - | UNIT B OPERATION = ON | - |
| | OFF | UNIT A OPERATION = ON | - | UNIT B OPERATION = ON | - |

|  |  | UNIT A OPERATION REQUEST || UNIT B OPERATION REQUEST ||
|  |  | ON | OFF | ON | OFF |
| --- | --- | --- | --- | --- | --- |
| UNIT A OPERATION | ON | UNIT A OPERATION = ON | - | UNIT A OPERATION = ON | - |
| | OFF | UNIT A OPERATION = ON | - | UNIT B OPERATION = ON | - |
| UNIT B OPERATION | ON | UNIT A OPERATION = ON | - | UNIT B OPERATION = ON | - |
| | OFF | UNIT A OPERATION = ON | - | UNIT B OPERATION = ON | - |

FIG. 8

BRAKING FORCE CONTROL SYSTEM

INCORPORATION BY REFERENCE

The disclosure of Japanese Patent Application No. 2017-171359 filed on Sep. 6, 2017 including the specification, drawings and abstract is incorporated herein by reference in its entirety.

BACKGROUND

1. Technical Field

The present disclosure relates to a braking force control system and, more particularly, to a redundant braking force control system.

2. Description of Related Art

Japanese Unexamined Patent Application Publication No. 2015-143058 (JP 2015-143058 A) discloses a vehicle control device provided with a master cylinder in which a master piston is driven and moved by the servo pressure in a servo chamber and the master pressure of a master chamber is changed by the master piston movement, a servo pressure generating device generating the servo pressure in the servo chamber, wheel cylinders respectively applying a braking force corresponding to a wheel cylinder pressure to vehicle wheels, and a brake actuator disposed between the master cylinder and each wheel cylinder and configured to be capable of individually applying a target wheel cylinder pressure. With the configuration of the vehicle control device, the wheel cylinder pressure can be adjusted by either the servo pressure generating device or the brake actuator being operated.

SUMMARY

In a redundant braking force control system provided with a braking mechanism generating a braking force corresponding to a braking oil pressure in a vehicle and a plurality of units capable of adjusting the braking oil pressure supplied to the braking mechanism, various types of braking control can be realized by alternatively operating any of the units.

In the redundant braking force control system, a unit suitable for each braking control can be operated. However, the operating unit needs to be switched with braking control execution in a case where a unit other than the unit that executes braking control operates when a braking control execution request is made. This situation may arise in a case where, for example, different units are used for braking control when the executed braking control continuously switched. In this case, the controllability of the braking oil pressure supplied to the braking mechanism may be deteriorated by switching of the operating unit and vehicle acceleration fluctuation or the like may occur.

The present disclosure provides a braking force control system with which deterioration of the controllability of a braking oil pressure supplied to a braking mechanism during braking control execution can be suppressed in a redundant braking force control system.

An aspect of the disclosure relates to a braking force control system that executes braking control for controlling a braking force of a vehicle. The braking force control system includes a braking mechanism configured to generate a braking force for the vehicle, the braking force corresponding to a braking oil pressure, a first unit configured to supply a braking oil pressure to the braking mechanism through a first path, a second unit configured to supply a braking oil pressure to the braking mechanism through a second path, and an electronic control unit configured to execute the braking control by alternatively operating the first unit or the second unit. The electronic control unit is configured to execute first braking control by operating the first unit in a case where the second unit is not operated when a first execution request for the first braking control is received. The electronic control unit is configured to execute the first braking control by continuously operating the second unit in a case where the second unit is operated when the first execution request for the first braking control is received.

In the braking force control system according to the aspect of the disclosure, the electronic control unit may be configured to execute the first braking control by operating the second unit in a case where the first unit is not operated when a second execution request for second braking control differing from the first braking control is received. The electronic control unit may be configured to execute the second braking control by continuously operating the first unit in a case where the first unit is operated when the second execution request for the second braking control is received.

In the braking force control system according to the aspect of the disclosure, in a case where a stop request for stopping the operation of the first unit or the second unit is received, the electronic control unit may stop the operation of the first unit or the second unit after a predetermined delay time has elapsed from when the stop request is received.

In the braking force control system according to the aspect of the disclosure, the second unit may be configured to be higher in braking oil pressure responsiveness than the first unit. The electronic control unit may be configured to execute second braking control by operating the second unit in a case where the first unit is not operated when an execution request for the second braking control differing from the first braking control is received. The electronic control unit may be configured to execute the second braking control by stopping the operation of the first unit and operating the second unit in a case where the first unit is operated when an execution request for the second braking control is received.

In the braking force control system according to the aspect of the disclosure, in a case where a stop request for stopping the operation of the second unit is received, the electronic control unit stops the operation of the second unit after a predetermined delay time has elapsed from when the stop request is received.

According to the aspect of the disclosure, the first unit is operated with respect to an execution request for the first braking control in a case where the second unit is not operated and the second unit is continuously operated with respect to an execution request for the first braking control in a case where the second unit is operated. As a result, the operating unit is not switched from the second unit to the first unit according to the execution of the first braking control, and thus hydraulic controllability deterioration during the execution of the first braking control can be suppressed.

According to the aspect of the disclosure, the second unit is operated with respect to an execution request for the second braking control in a case where the first unit is not operated and the first unit is continuously operated with respect to an execution request for the second braking control in a case where the first unit is operated. As a result, the operating unit is not switched from the first unit to the second unit according to the execution of the second braking control, and thus hydraulic controllability deterioration during the execution of the second braking control can be suppressed.

According to the aspect of the disclosure, in a case where the stop request for stopping the operating unit is received, the operating unit is stopped after a predetermined delay time has elapsed from when the stop request is received. As a result, the operating unit can be continuously operated in a case where an execution request for the next braking control is made within the predetermined delay time.

According to the aspect of the disclosure, the second unit is configured to be higher in braking oil pressure responsiveness than the first unit. In the system, the second unit is operated, regardless of whether or not the first unit operates, with respect to an execution request for the second braking control. As a result, the second unit higher in braking oil pressure responsiveness can be operated at all times during the second braking control, and thus control requesting braking oil pressure responsiveness can be dealt with.

According to the aspect of the disclosure, in a case where the stop request for stopping the operation of the second unit is received, the second unit is stopped after a predetermined delay time has elapsed when the stop request is received. As a result, the operating second unit can be continuously operated in a case where an execution request for the next second braking control is made within the predetermined delay time.

As described above, according to the aspect of the disclosure, deterioration of the controllability of a braking oil pressure supplied to a braking mechanism during braking control execution can be suppressed in a redundant braking force control system.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, embodiments will be described with reference to accompanying drawings. The disclosure is not limited to the numbers, quantities, amounts, ranges, and so on of respective elements mentioned in the following description of the embodiments unless limitation is clearly stated or unless limitation is obvious in principle. Structures, steps, and so on described below in relation to the embodiments are not indispensable for the disclosure unless their indispensableness is clearly stated or unless their indispensableness is obvious in principle.

First Embodiment

System Configuration of Vehicle According to First Embodiment

Figure 1:
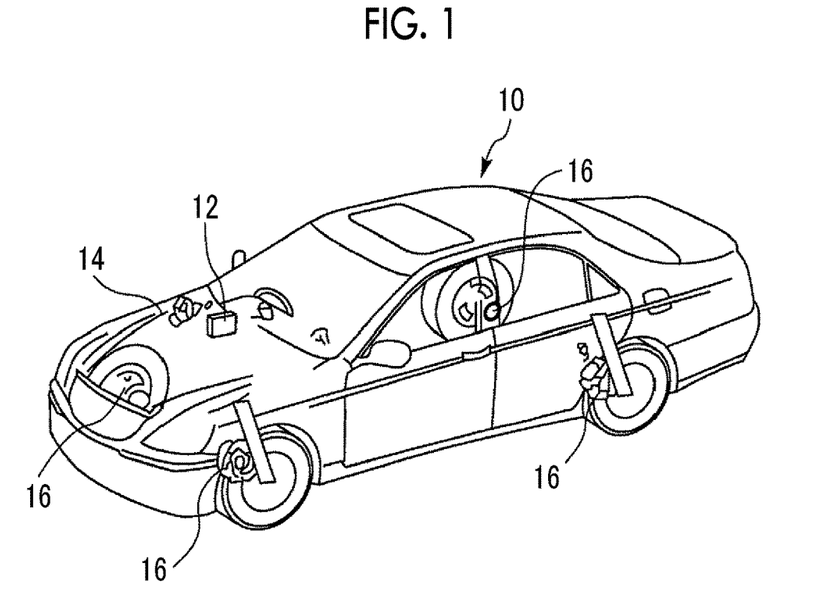
FIG. 1 is a diagram illustrating the configuration of a vehicle in which a braking force control system according to a first embodiment is mounted.

Hereinafter, a first embodiment will be described with reference to the drawings. FIG. 1 is a diagram illustrating the configuration of a vehicle in which a braking force control system according to the first embodiment is mounted. A driving assistance system control electronic control unit (ECU) 12 is mounted in a vehicle 10. The driving assistance system control ECU 12 has a function to perform braking control of a driving assistance system. The braking control includes, for example, an anti-lock brake system (ABS), vehicle stability control (VSC), traction control (TRC), auto cruise control (ACC), a pre-crash safety system (PCS), and autonomous driving. The driving assistance system control ECU 12 may be configured as a single ECU performing the braking control described above and may also be individually configured for each type of the braking control.

A brake system 14 is mounted in the vehicle 10. The brake system 14 includes a brake actuator for adjusting a braking oil pressure and a brake ECU as a brake actuator controller. The brake ECU calculates a command value for target braking oil pressure generation in response to an operation request from the driving assistance system control ECU 12 and supplies the command value to the brake actuator. The configuration of the brake system 14 will be described in detail later.

Each wheel of the vehicle 10 incorporates a braking mechanism 16. The braking mechanism 16 is a device generating a braking force corresponding to the supplied braking oil pressure in each wheel. The structure of the braking mechanism 16 is not limited. Various known structures for generating the braking force corresponding to the supplied braking oil pressure in each wheel can be adopted.

Figure 2:
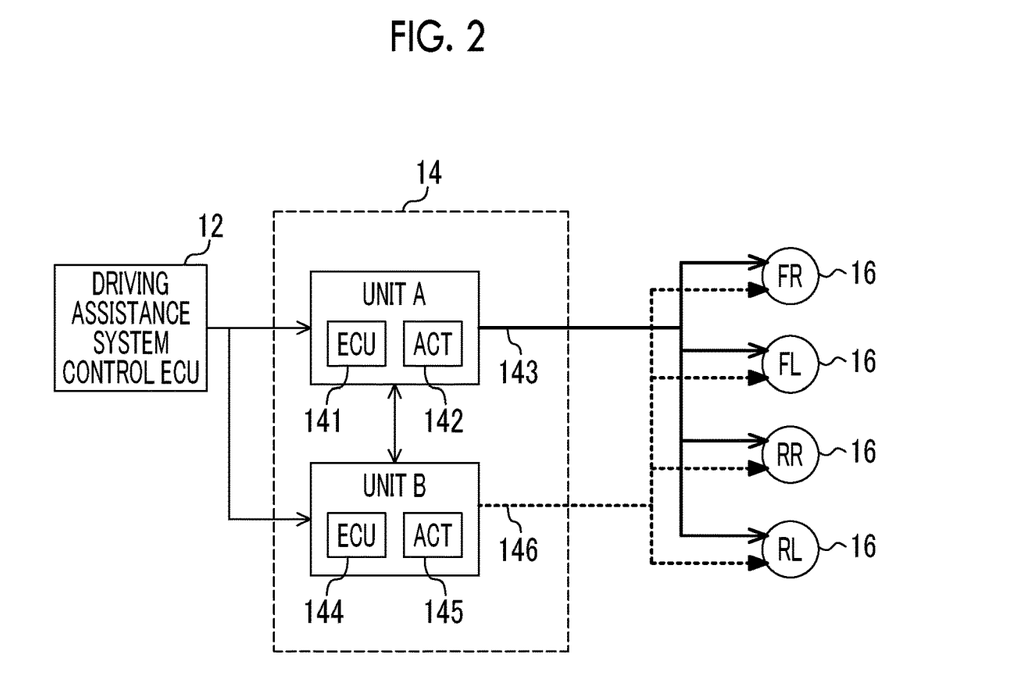
FIG. 2 is a diagram illustrating the configuration of the braking force control system according to the first embodiment.

FIG. 2 is a diagram illustrating the configuration of the braking force control system according to the first embodiment. As illustrated in FIG. 2, the braking force control system includes the driving assistance system control ECU 12, the brake system 14, and the braking mechanism 16 described above. The brake system 14 according to the first embodiment is configured as a redundant brake system. Specifically, the brake system 14 includes a unit A and a unit B. The unit A is provided with a brake ECU 141, a brake actuator 142, and a hydraulic path 143. The unit B is provided with a brake ECU 144, a brake actuator 145, and a hydraulic path 146. The brake system 14 generates the braking oil pressure by alternatively operating either the unit A or the unit B. When the hydraulic paths 143, 146 of the respective units differ in configuration from each other and the brake actuators 142, 145 of the respective units differ in configuration from each other, differences occur in terms of responsiveness and controllability of the braking oil pressure. The brake system 14 according to the first embodiment is configured such that the unit A is higher in hydraulic responsiveness than the unit B and the unit B is higher in hydraulic controllability than the unit A. The brake system 14 is not limited to the configurations of the hydraulic path and the brake actuator insofar as the brake system 14 is configured as a redundant brake system. Although the hydraulic paths of the unit A and the unit B are configured in parallel in the example that is illustrated in FIG. 2, the hydraulic paths may also be configured in series. In addition, the brake ECUs 141, 144 of the respective units may be configured as a single unit as a common brake ECU.

The driving assistance system control ECU 12 turns ON an operation request with respect to a unit of the brake system 14 in response to a braking control execution request from the driving assistance system. The units in which the operation requests are turned ON are stored in association with various types of braking control in the driving assistance system control ECU 12. Specifically, the driving assistance system control ECU 12 turns ON the operation request of the unit A higher in hydraulic responsiveness with regard to control relating to ensuring safety of the vehicle 10, such as ABS, VSC, PCS, and TRC, among a plurality of types of braking control. The driving assistance system control ECU 12 turns ON the operation request of the unit B higher in hydraulic controllability with regard to control of the driving assistance system such as ACC with no hydraulic responsiveness request. In the following description, braking control in which the operation request of the unit B is turned ON will be referred to as "first braking control" and braking control in which the operation request of the unit A is turned ON will be referred to as "second braking control". The brake system 14 operates a unit in which the operation request is turned ON to generate a target braking oil pressure and supplies the target braking oil pressure to the braking mechanism 16. The braking mechanism 16 generates a braking force corresponding to the supplied braking oil pressure in each wheel.

Operation of First Embodiment

As described above, the driving assistance system control ECU 12 turns ON the operation request of the unit A with respect to a second braking control execution request and turns ON the operation request of the unit B with respect to a first braking control execution request. The above-described configuration, however, has the following problems. In other words, in a case where the first braking control by ACC or the like is executed, the driving assistance system control ECU 12 turns ON the operation request of the unit B of the brake system 14. The brake system 14 operates the unit B in response to the operation request of the unit B and generates a target braking oil pressure. In a case where the second braking control by PCS or the like is executed, the driving assistance system control ECU 12 turns ON the operation request of the unit A. The brake system 14 operates the unit A in response to the operation request of the unit A and generates a target braking oil pressure.

Here, in a case where a request for the second braking control is made during the execution of the first braking control in the above-described configuration, switching occurs from the first braking control in which the unit B is operated to the second braking control in which the unit A is operated. In the configuration described above, the operating unit is switched from the unit B to the unit A during the switching from the first braking control to the second braking control. As a result, controllability may deteriorate due to braking oil pressure fluctuation.

In this regard, in the braking force control system according to the first embodiment, the second braking control is executed by the unit B being continuously operated in a case where a request for the second braking control is made during the execution of the first braking control. In addition, in the braking force control system according to the first embodiment, the first braking control is executed by the unit A being continuously operated in a case where a request for the first braking control is made during the execution of the second braking control.

Figure 3:
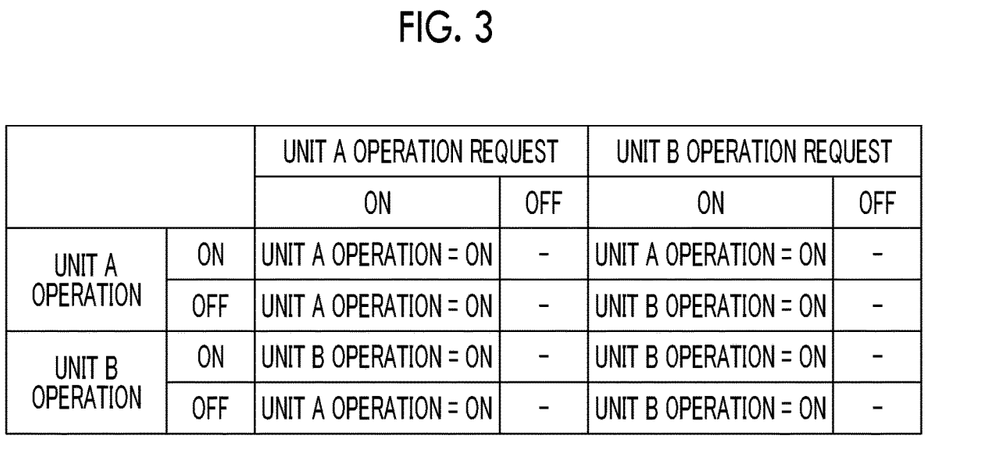
FIG. 3 is a table for describing an operation of the braking force control system according to the first embodiment.

FIG. 3 is a table for describing the operation of the braking force control system according to the first embodiment. As illustrated in FIG. 3, in a case where an operation request of the unit A or the unit B is turned ON in a state where no unit operates, the unit in which the operation request is turned ON is operated and braking control is executed. In addition, in a case where an operation request of the unit A is turned ON by a request for the second braking control being made in a state where the unit A operates, the unit A is continuously operated and the second braking control is executed. In addition, in a case where an operation request of the unit B is turned ON by a request for the first braking control being made in a state where the unit B operates, the unit B is continuously operated and the first braking control is executed.

In a case where an operation request of the unit B is turned ON by a request for the first braking control being made in a state where the unit A operates, the unit A is continuously operated and the first braking control is executed without the operation request of the unit B being followed. In a case where an operation request of the unit A is turned ON by a request for the second braking control being made in a state where the unit B operates, the unit B is continuously operated and the second braking control is executed without the operation request of the unit A being followed.

As described above, in the braking force control system according to the first embodiment, the operating unit is continuously operated during switching between the second braking control and the first braking control. As a result, braking oil pressure fluctuation during braking control switching can be further suppressed, and thus fluctuations of the acceleration of the vehicle 10 can be further suppressed.

Also assumable is a new braking control request made within a short period of time from ON-to-OFF switching of a unit operation request. In this case, the unit operation requests are not continuous with the short operation stop period therebetween, and thus controllability may deteriorate due to braking oil pressure fluctuation.

In this regard, in the braking force control system according to the first embodiment, the operation of the unit A or the unit B is maintained ON for a predetermined delay time in a case where the operation request of the unit is switched from ON to OFF. Based on this control, a continuous unit operation can be performed even in a case where a request for the next braking control is made within a short period of time after the operation request of the unit A or the unit B is turned OFF.

Specific Processing According to First Embodiment

Figure 4:
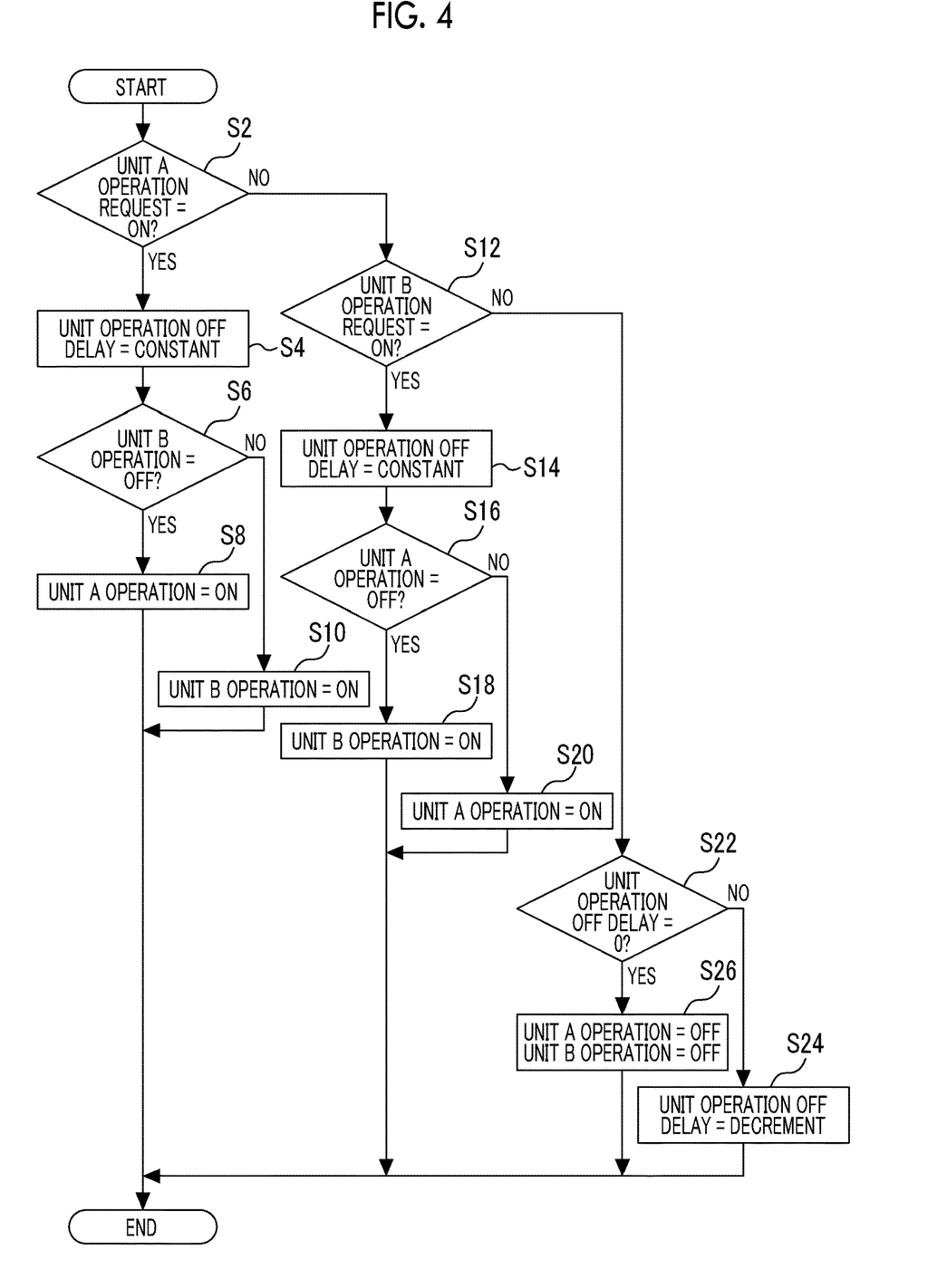
FIG. 4 is a flowchart of a routine executed in the braking force control system according to the first embodiment.

Specific processing executed in the braking force control system according to the first embodiment will be described with reference to a drawing. FIG. 4 is a flowchart illustrating a routine executed in the braking force control system according to the first embodiment. The routine illustrated in FIG. 4 is repeatedly executed at a predetermined calculation cycle by the brake ECUs 141, 144 of the unit A and the unit B of the brake system 14.

The driving assistance system control ECU 12 turns ON the operation request of the unit A in a case where a second braking control execution request is received. In addition, the driving assistance system control ECU 12 turns ON the operation request of the unit B in a case where a first braking control execution request is received. In the routine illustrated in FIG. 4, a determination is made first on whether or not the operation request of the unit A input from the driving assistance system control ECU 12 is ON (Step S2). In a case where determination establishment is recognized as a result of the above, the processing proceeds to the next step and a counter (hereinafter, referred to as a "unit operation OFF delay") for counting the delay time until unit operation OFF is set to a predetermined constant (Step S4).

Then, a determination is made on whether or not the operation state of the unit B is OFF (Step S6). In a case where determination establishment is recognized as a result of the above, a determination is made that braking control operating the unit B is not performed. In this case, the processing proceeds to the next step and the unit A associated with executed braking control is operated (Step S8). In a case where determination establishment is not recognized in Step S6, a determination is made that braking control is performed with the unit B operated. In this case, the processing proceeds to the next step and the unit B not associated with executed braking control is continuously operated (Step S10).

In a case where a determination is made in Step S2 that the operation request of the unit A is OFF, the processing proceeds to the next step and a determination is made on whether or not the operation request of the unit B input from the driving assistance system control ECU 12 is ON (Step S12). In a case where determination establishment is recognized as a result of the above, the processing proceeds to the next step and the unit operation OFF delay is set to a predetermined constant (Step S14).

Then, a determination is made on whether or not the operation state of the unit A is OFF (Step S16). In a case where determination establishment is recognized as a result of the above, a determination is made that braking control operating the unit A is not performed. In this case, the processing proceeds to the next step and the unit B associated with executed braking control is operated (Step S18). In a case where determination establishment is not recognized in Step S16, a determination is made that braking control is performed with the unit A operated. In this case, the processing proceeds to the next step and the unit A not associated with executed braking control is continuously operated (Step S20).

In a case where a determination is made in Step S12 that the operation request of the unit B is OFF, the processing proceeds to the next step and a determination is made on establishment of a unit operation OFF delay of 0 (Step S22). In a case where determination establishment is not recognized as a result of the above, the unit operation OFF delay is decremented (Step S24) and this routine is terminated. In a case where establishment of a unit operation OFF delay of 0 is recognized in Step S22, a determination is made that a predetermined delay time has elapsed and the processing proceeds to the next step, in which the operations of the unit A and the unit B are turned OFF and the operating units are stopped (Step S26).

Although the unit B is described as a "first unit", the unit A is described as a "second unit", and the brake ECU is described as an "electronic control unit" in the braking force control system according to the first embodiment, this is an example of the disclosure.

Modification Example of First Embodiment

The braking force control system according to the first embodiment may also be modified as follows.

The brake system 14 according to the first embodiment may also be configured such that the unit A and the unit B have at least the same hydraulic responsiveness or the same hydraulic controllability.

The control for delaying a unit operation OFF timing may be not executed. In this case, the processing of Steps S4, S14, S22, S24 in the routine illustrated in FIG. 4 may be omitted and the processing may proceed to Step S26 in a case where determination establishment is not recognized in Step S12.

Figure 5:
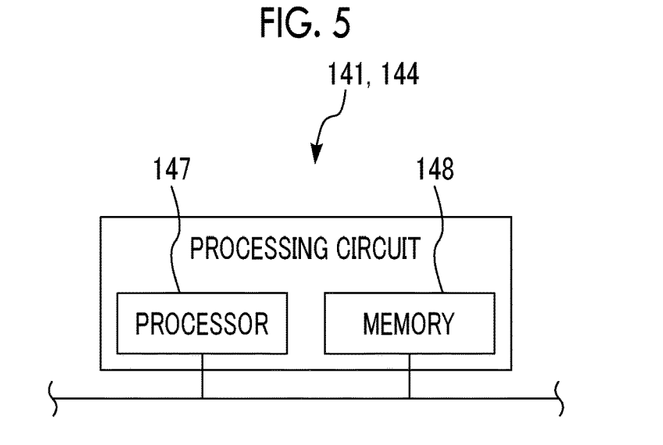
FIG. 5 is a diagram illustrating an example of the hardware configuration of a brake ECU of the braking force control system according to the first embodiment.

The brake ECUs 141, 144 of the braking force control system according to the first embodiment and a second embodiment (described later) may be configured as follows. FIG. 5 is a diagram illustrating a hardware configuration example of the brake ECUs 141, 144 of the braking force control system according to the first embodiment. Each function of the brake ECUs 141, 144 is realized by a processing circuit. In the example illustrated in FIG. 5, the processing circuit of the brake ECUs 141, 144 is provided with at least one processor 147 and at least one memory 148.

In a case where the processing circuit is provided with at least one processor 147 and at least one memory 148, each function of the brake ECUs 141, 144 is realized by software, firmware, or software-firmware combination. At least one of the software and the firmware is described as a program. At least one of the software and the firmware is stored in at least one memory 148. At least one processor 147 realizes each function of the brake ECUs 141, 144 by reading and executing the program stored in at least one memory 148. At least one processor 147 is also referred to as a central processing unit (CPU), a central processing device, a processing device, a calculation device, a microprocessor, a microcomputer, and a digital signal processor (DSP). For example, at least one memory 148 is a magnetic disk, a flexible disk, an optical disk, or a nonvolatile or volatile semiconductor memory such as a random access memory (RAM), a read only memory (ROM), a flash memory, an erasable programmable read only memory (EPROM), and an electrically erasable programmable read-only memory (EEPROM).

Figure 6:
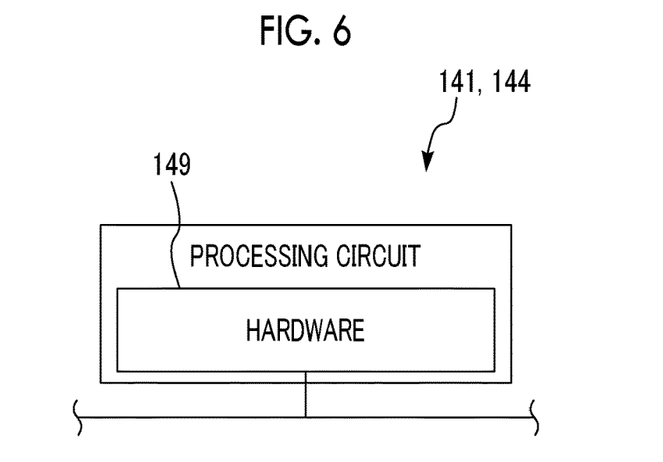
FIG. 6 is a diagram illustrating another example of the hardware configuration of the brake ECU of the braking force control system according to the first embodiment.

FIG. 6 is a diagram illustrating another example of the hardware configuration of the brake ECUs 141, 144 of the braking force control system according to the first embodiment. In the example illustrated in FIG. 6, the processing circuit of the brake ECUs 141, 144 is provided with at least one dedicated hardware 149.

In a case where the processing circuit is provided with at least one dedicated hardware 149, the processing circuit is, for example, a single circuit, a composite circuit, a programmed processor, a parallel programmed processor, an application specific integrated circuit (ASIC), a field-programmable gate array (FPGA), or a combination thereof. The function of each unit of the brake ECU 141 may be realized by the processing circuit. In addition, the functions of respective units of the brake ECU 141 may be collectively realized by the processing circuit.

Regarding each function of the brake ECUs 141, 144, some of the functions may be realized by the dedicated hardware 149 and the other functions may be realized by software or firmware. As described above, the processing circuit realizes each function of the brake ECUs 141, 144 by the dedicated hardware 149, software, firmware, or a combination thereof.

Second Embodiment

The braking force control system according to the second embodiment will be described below. The braking force control system according to the second embodiment can be realized by the brake ECUs 141, 144 executing the control routine illustrated in FIG. 8 (described later) and the system configuration illustrated in FIGS. 1 and 2 being used.

Characteristics of Second Embodiment

The brake system 14 according to the second embodiment is configured such that the unit A is higher in hydraulic responsiveness than the unit B. In the braking force control system according to the second embodiment, the unit A is continuously operated and the first braking control is executed in a case where a request for the first braking control is made with the unit A operating. In a case where a request for the first braking control is made with the unit B operating, the operated unit is switched from the unit B to the unit A and the second braking control is executed.

Figure 7:
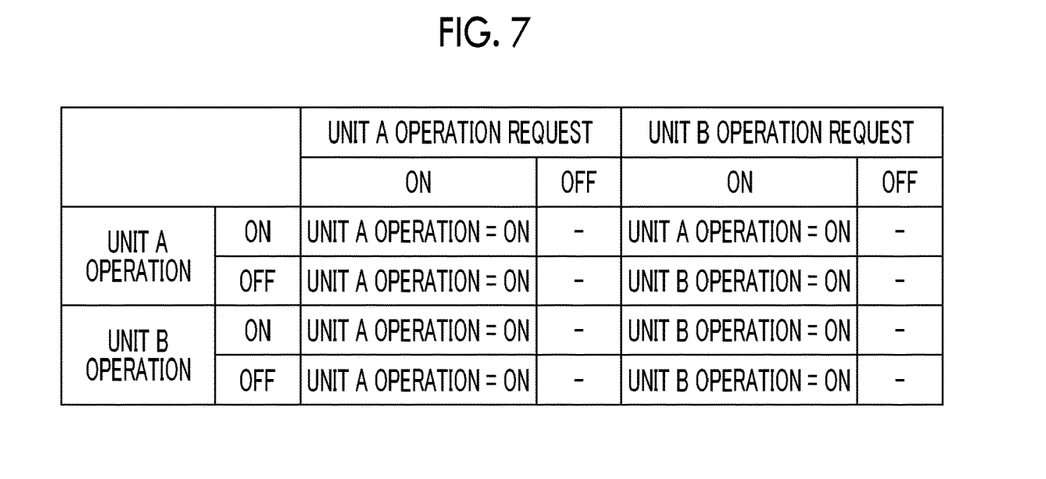
FIG. 7 is a table for describing an operation of a braking force control system according to a second embodiment.

FIG. 7 is a table for describing the operation of the braking force control system according to the second embodiment. As illustrated in FIG. 7, in a case where an operation request of the unit A or the unit B is turned ON in a state where no unit operates, the unit in which the operation request is turned ON is operated and braking control is executed. In addition, in a case where an operation request of the unit A is turned ON by a request for the second braking control being made in a state where the unit A operates, the unit A is continuously operated and the second braking control is executed. In addition, in a case where an operation request of the unit B is turned ON by a request for the first braking control being made in a state where the unit B operates, the unit B is continuously operated and the first braking control is executed.

In a case where an operation request of the unit B is turned ON by a request for the first braking control being made in a state where the unit A operates, the unit A is continuously operated and the first braking control is executed without the operation request of the unit B being followed. In a case where an operation request of the unit A is turned ON by a request for the second braking control being made in a state where the unit B operates, the second braking control is executed with the unit B stopped and the unit A operated.

As described above, in the braking force control system according to the second embodiment, the operating unit B is switched to the unit A without being continuously operated in a request for the first braking control during the operation of the unit B whereas the operating unit A is continuously operated in a request for the second braking control during the operation of the unit A. As a result, with regard to control relating to ensuring safety of the vehicle 10 such as ABS, VSC, PCS, and TRC, the unit A higher in hydraulic responsiveness can be operated at all times.

Specific Processing According to Second Embodiment

Figure 8:
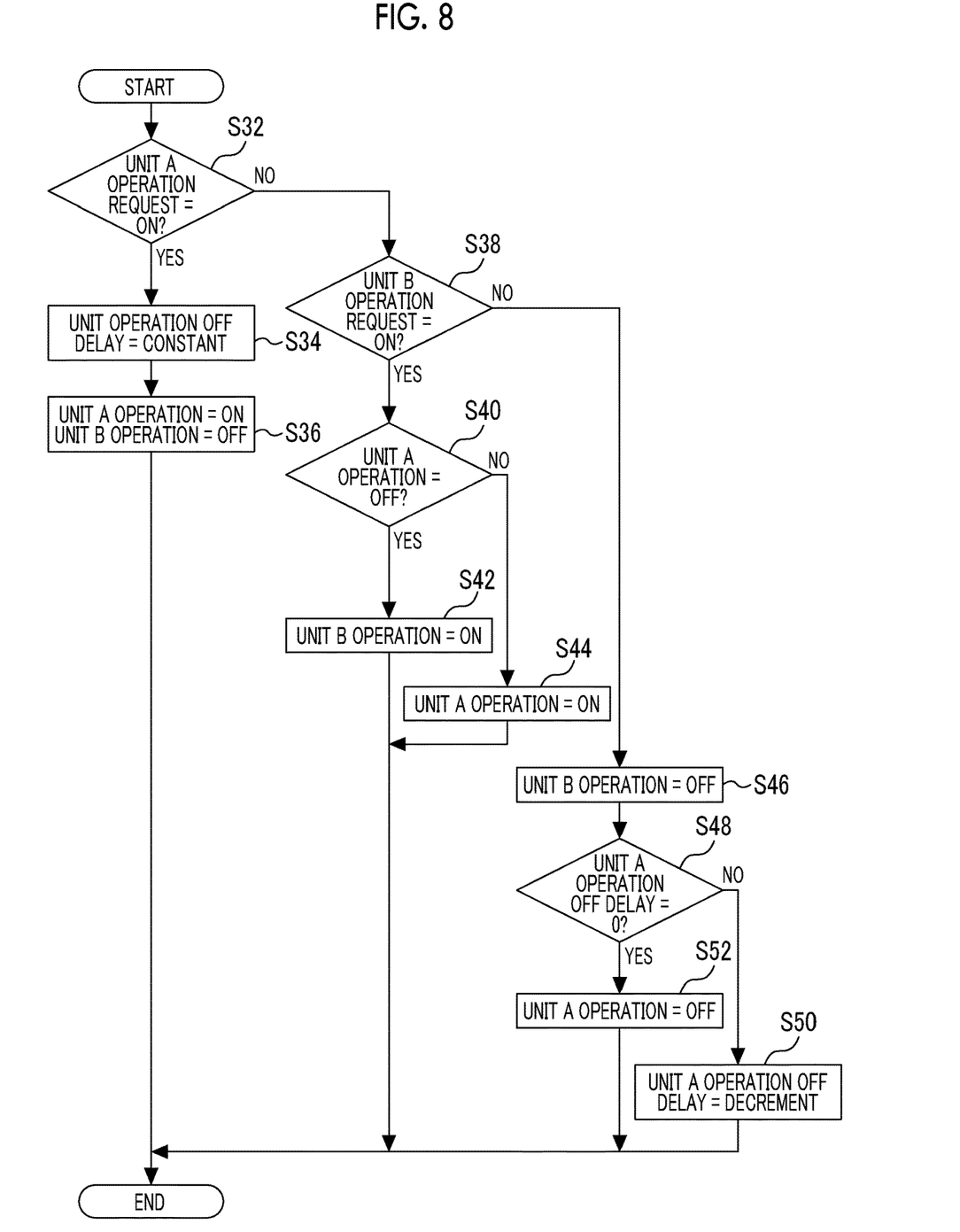
FIG. 8 is a flowchart of a routine executed in the braking force control system according to the second embodiment.

Specific processing executed in the braking force control system according to the second embodiment will be described with reference to a drawing. FIG. 8 is a flowchart illustrating a routine executed in the braking force control system according to the second embodiment. The routine illustrated in FIG. 8 is repeatedly executed at a predetermined calculation cycle by the brake ECUs 141, 144 of the unit A and the unit B of the brake system 14.

In the routine illustrated in FIG. 8, a determination is made first on whether or not the operation request of the unit A input from the driving assistance system control ECU 12 is ON (Step S32). In a case where determination establishment is recognized as a result of the above, the processing proceeds to the next step and a counter (hereinafter, referred to as a "unit A operation OFF delay") for counting the delay time until unit A operation OFF is set to a predetermined constant (Step S34). Next, the operation of the unit B is stopped in a case where the unit A is operated and the unit B operates (Step S36).

In a case where a determination is made in Step S32 that the operation request of the unit A is OFF, the processing proceeds to the next step and a determination is made on whether or not the operation request of the unit B input from the driving assistance system control ECU 12 is ON (Step S38). In a case where determination establishment is recognized as a result of the above, the processing proceeds to the next step and a determination is made on whether or not the operation state of the unit A is OFF (Step S40). In a case where determination establishment is recognized as a result of the above, a determination is made that braking control operating the unit A is not performed. In this case, the processing proceeds to the next step and the unit B associated with executed braking control is operated (Step S42). In a case where determination establishment is not recognized in Step S40, a determination is made that braking control is performed with the unit A operated. In this case, the processing proceeds to the next step and the unit A not associated with executed braking control is continuously operated (Step S44).

In a case where a determination is made in Step S38 that the operation request of the unit B is OFF, the processing proceeds to the next step and the operation of the unit B is stopped in a case where the unit B operates (Step S46). Then, a determination is made on establishment of a unit A operation OFF delay of 0 (Step S48). In a case where determination establishment is not recognized as a result of the above, the unit A operation OFF delay is decremented and this routine is terminated (Step S50). In a case where establishment of a unit A operation OFF delay of 0 is recognized in Step S48, a determination is made that a predetermined delay time has elapsed and the processing proceeds to the next step, in which the operation of the unit A is stopped (Step S52).

Although the unit B is described as a "first unit", the unit A is described as a "second unit", and the brake ECU is described as an "electronic control unit" in the braking force control system according to the second embodiment, this is an example of the disclosure.

Modification Example of Second Embodiment

The braking force control system according to the second embodiment may also be modified as follows.

The control for delaying a unit A operation OFF timing may be not executed. In this case, the processing of Steps S34, S48, S50 in the routine illustrated in FIG. 8 may be omitted and the processing may proceed to Step S52 after the processing of Step S46.

What is claimed is:

1. A braking force control system that executes braking control for controlling a braking force of a vehicle, the braking force control system comprising:
   a braking mechanism configured to generate a braking force for the vehicle, the braking force corresponding to a braking oil pressure;
   first unit configured to supply a first braking oil pressure to the braking mechanism through a first path;

a second unit configured to supply a second braking oil pressure to the braking mechanism through a second path; and an electronic control unit configured to execute the braking control by alternatively operating the first unit and the second unit, wherein the electronic control unit is configured to determine whether the second unit is being operated to supply the second braking oil pressure when a first execution request for first braking control is received, execute the first braking control by operating the first unit to supply the first braking oil pressure, based on determining the second unit is not being operated when the first execution request for the first braking control is received, and execute the first braking control by continuously operating the second unit to supply the second braking oil pressure, based on determining the second unit is being operated when the first execution request for the first braking control is received.

2. The braking force control system according to claim 1, wherein the electronic control unit is further configured to determine whether the first unit is being operated to supply the first braking oil pressure when a second execution request for second braking control differing from the first braking control is received, execute the second braking control by operating the second unit to supply the second braking oil pressure, based on determining the first unit is not being operated when the second execution request for the second braking control differing from the first braking control is received, and execute the second braking control by continuously operating the first unit to supply the first braking oil pressure, based on determining the first unit is being operated when the second execution request for the second braking control is received.

3. The braking force control system according to claim 1, wherein, in a case where a stop request for stopping the operation of the first unit or the second unit is received, the electronic control unit stops the operation of the first unit or the second unit after a predetermined delay time has elapsed from when the stop request is received.

4. The braking force control system according to claim 1, wherein:

the second unit is configured to be higher in braking oil pressure responsiveness than the first unit; and the electronic control unit is further configured to determine whether the first unit is being operated to supply the first braking oil pressure when a second execution request for second braking control differing from the first braking control is received, execute the second braking control by operating the second unit to supply the second braking oil pressure, based on determining the first unit is not being operated when the second execution request for the second braking control differing from the first braking control is received, and execute the second braking control by stopping the operation of the first unit and operating the second unit to supply the second braking oil pressure, based on determining the first unit is being operated when the second execution request for the second braking control is received.

5. The braking force control system according to claim 4, wherein, in a case where a stop request for stopping the operation of the second unit is received, the electronic control unit stops the operation of the second unit after a predetermined delay time has elapsed from when the stop request is received.

6. The braking force control system according to claim 1, wherein the braking mechanism is configured to generate the braking force for the vehicle, the vehicle being an automobile.

7. The braking force control system according to claim 1, wherein the electronic control unit is further configured to obtain a request for the first braking control to be performed by the first unit, based on the first execution request for the first braking control, and the electronic control unit is configured execute the first braking control by continuously operating the second unit to supply the second braking oil pressure, based on the first execution request for the first braking control to be performed by the first unit being obtained and the second unit being operated when the first execution request for the first braking control is received.

* * * * *